No. 706,765. Patented Aug. 12, 1902.
J. T. LEINBERGER & J. G. SCHMIDT.
SUGAR BEET PLOW.
(Application filed Oct. 22, 1901.)

(No Model.)

WITNESSES:
W. A. Stephens
J. Gould.

INVENTOR'S
John T. Leinberger
John G. Schmidt
BY
Geo. B. Willcox. ATTORNEY

UNITED STATES PATENT OFFICE.

JOHN T. LEINBERGER AND JOHN G. SCHMIDT, OF FRANKENLUST TOWNSHIP, BAY COUNTY, MICHIGAN.

SUGAR-BEET PLOW.

SPECIFICATION forming part of Letters Patent No. 706,765, dated August 12, 1902.

Application filed October 22, 1901. Serial No. 79,528. (No model.)

*To all whom it may concern:*

Be it known that we, JOHN T. LEINBERGER and JOHN G. SCHMIDT, citizens of the United States, residing in Frankenlust township, in the county of Bay and State of Michigan, have invented certain new and useful Improvements in Sugar-Beet Plows; and we do hereby declare the following to be a full, clear, and exact description of the invention, such as will enable others skilled in the art to which it appertains to make and use the same.

This invention is a sugar-beet plow for lifting sugar-beets and like vegetables; and the improvement consists in certain constructions and devices by which the object of our invention is attained. This object is to produce a sugar-beet plow or lifter of the class described in Patent No. 638,303, issued December 5, 1899, to F. A. Wechsler, J. T. Leinberger, and J. G. Schmidt, jointly, but being so improved as regards the lifting-bar that the latter may be adjusted to different inclinations in a vertical plane to suit various conditions of soil and the sizes and kinds of vegetables to be lifted.

The improvement is illustrated in the accompanying drawings, in which—

Figure 1:
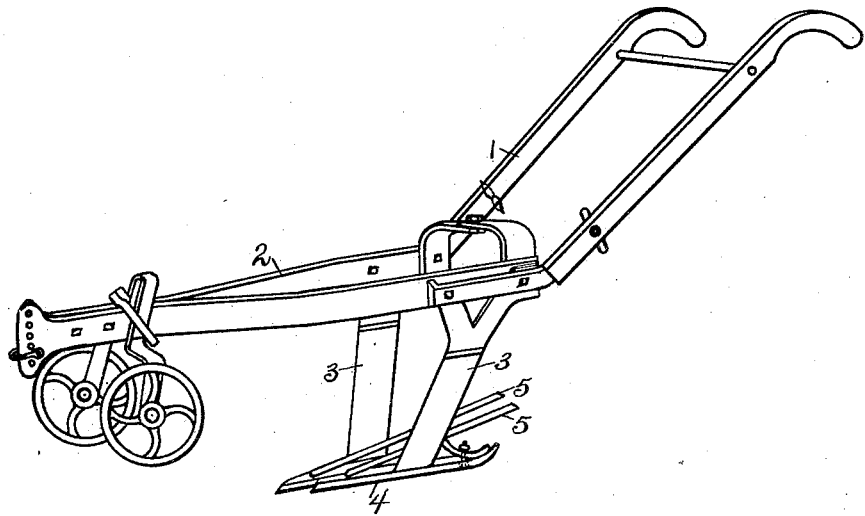
Figure 4:
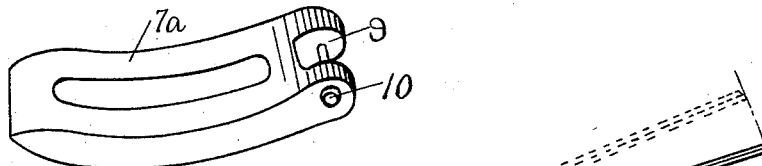
Figure 2:
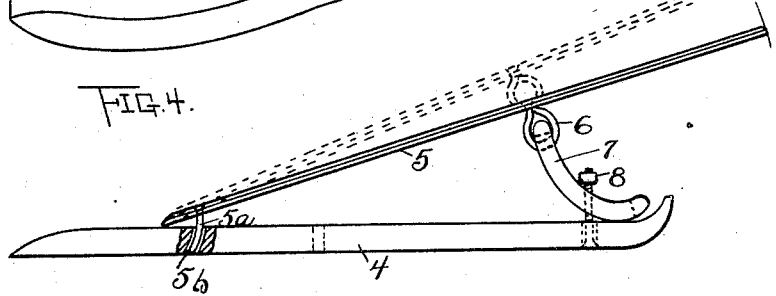
Figure 3:
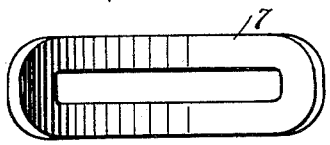

Figure 1 is a perspective view of a beet-lifting plow. Fig. 2 is a side elevation of a single adjustable lifting shoe and bar. Fig. 3 is a rear view of the curved link by which the vertical adjustment of the lifting-bar is effected. Fig. 4 is a perspective view of a modified form of link.

As is clearly shown in the drawings, the plow consists in the handles 1, frame 2, to which the standards or colters 3 are secured, and the digging-shoes 4, secured to the lower ends of the colters. To this construction, which is shown and described in the patent referred to, we have added the improved adjustable lifting-bars 5, which form the essential part of our invention.

The means by which the rear end of the bar 5 is raised or lowered may be of any suitable construction; but in practice we prefer to employ the devices shown in Fig. 2, in which $5^a$ is a downwardly-projecting curved finger secured to the lower end of the lifting-bar 5 by welding or otherwise and adapted to fit an inclined curved opening $5^b$, provided in the shoe 4. By this means the lower end of the lifting-bar 5 is always held in contact with the shoe 4, even though the rear end of the bar 5 is raised and lowered. Attached to the upper part of the bar 5 is an eye 6, in which is secured a curved slotted link 7, the lower end of which rests upon the rear part of the shoe 4. The link 7 is clamped to the shoe 4 by means of a nut 8, secured upon a threaded bolt having its head countersunk in the face of the shoe 4. When the nut 8 is screwed down upon the curved link, the upper end of the link is forced forward, thus firmly locking the projection $5^a$ in its hole $5^b$ and holding the lower end of the bar 5 tightly down upon the shoe. By loosening the nut 8 and shifting the slotted link forward or back the rear end of the lifting-shoe can be raised or lowered, as indicated by the dotted lines in Fig. 2.

The modified form of the link $7^a$, as shown in Fig. 4, is provided with a short slot 9 at its upper end to receive the eye 6, which is held in place by a rivet or bolt 10. This construction permits the link to be cast and afterward secured to the eye 6 instead of being forged, thereby reducing the cost of manufacture.

By the means above described we have so improved the beet-lifting plow that it is adapted by this adjustable feature to be applied to many classes of work for which it was heretofore but imperfectly suited.

What we claim as our invention, and desire to secure by Letters Patent, is—

1. In combination with a device of the class described, comprising a frame carrying a pair of supports having shoes on their lower ends extending in advance and in the rear of the supports; inclined lifting-bars secured at their forward ends to the forward part of said shoes and having their rear portions supported from the shoes by adjustable means connecting said bars and shoes whereby the inclination of the bars may be adjusted.

2. In combination with a device of the class described, comprising a pair of supports having shoes mounted on their lower ends; a pair of inclined lifting-bars having their front ends removably secured to said shoes, together with means for raising or lowering the rear ends of said bars.

3. In combination with a device of the class described, comprising a pair of standards having shoes mounted on their lower ends; inclined lifting-bars having their front ends removably secured to said shoes, together with a curved link for raising or lowering the rear end of each bar, and means for clamping said link to the shoe, substantially as described.

4. A digging device for plows of the class described, comprising a pair of digging-shoes, a pair of inclined lifting-bars each having near its front end a downwardly-projecting finger to engage a socket in the shoe; together with a curved link for raising or lowering the rear end of each bar, and a bolt for clamping said link to the shoe.

5. A digging device for plows of the class described, comprising a pair of digging-shoes, a pair of inclined lifting-bars each having near its front end a downwardly-projecting curved finger to engage a curved socket in the shoe; together with a curved link for raising or lowering the rear end of each bar, and a bolt for clamping said link to the shoe, substantially as described.

In testimony whereof we affix our signatures in presence of two witnesses.

JOHN T. LEINBERGER.
JOHN G. SCHMIDT.

Witnesses:
  I. GOULD,
  W. A. STEPHENS.